United States Patent [19]
Pedemonte

[11] Patent Number: 5,931,974
[45] Date of Patent: Aug. 3, 1999

[54] DEEP BLACK DYE MIXTURES OF FIBER-REACTIVE AZO DYES AND USE THEREOF FOR DYEING HYDROXY- AND/OR CARBOXAMIDO-CONTAINING FIBER MATERIAL

[75] Inventor: Ronald P. Pedemonte, Eppstein-Vockenhausen, Germany

[73] Assignee: Dystar Textilfarben GmbH & Co., Deutschland KG, Germany

[21] Appl. No.: 09/123,603

[22] Filed: Jul. 28, 1998

[51] Int. Cl.$^6$ .................................. D06P 1/38; D06P 3/66
[52] U.S. Cl. .......................... 8/546; 8/549; 8/918; 8/641; 8/917; 8/924; 8/921
[58] Field of Search ............................... 8/543, 546, 549, 8/917, 918, 921, 924

[56] References Cited

U.S. PATENT DOCUMENTS

| | | |
|---|---|---|
| 5,445,654 | 8/1995 | Hussong et al. ............................ 8/546 |
| 5,508,389 | 4/1996 | Mischke et al. . |
| 5,690,698 | 11/1997 | Von Der Eltz et al. . |
| 5,779,739 | 7/1998 | Von Der Eltz . |

FOREIGN PATENT DOCUMENTS

| | | |
|---|---|---|
| 90114 | 10/1983 | European Pat. Off. . |
| 58-160362 | 12/1983 | Japan . |
| 1-315469 | 12/1989 | Japan . |
| 93-5679 | 2/1990 | Rep. of Korea . |

*Primary Examiner*—Margaret Einsmann
*Attorney, Agent, or Firm*—Connolly and Hutz

[57] ABSTRACT

A dye mixture comprising one or more disazo dyes composed of 1-amino-3,6-disulfo-8-naphthol as the coupling component and of two diazo components of the aniline series containing each a fiber-reactive group of the vinylsulfone series, one or more monoazo dyes composed of a carboxy-substituted benzoylamino-sulfo-naphthol coupling component and a diazo component of the aniline series, containing a fiber-reactive group of the vinylsulfone series and optionally one or two monoazo dyes with 1-amino-3,6-disulfo-8-naphthol as a coupling component to which is coupled in the ortho-position to the amino group a diazo component of the aniline series substituted by a fiber-reactive group of the vinylsulfone series. The dye mixtures yield on hydroxy- and/or carboxamido-containing fiber materials, such as cellulose fibers, in particular cotton, or on, for example, wool and synthetic polyamide fibers, deep black dyeings.

9 Claims, No Drawings

DEEP BLACK DYE MIXTURES OF FIBER-REACTIVE AZO DYES AND USE THEREOF FOR DYEING HYDROXY- AND/OR CARBOXAMIDO-CONTAINING FIBER MATERIAL

The present invention relates to the field of fiber-reactive dyes.

Black-dyeing mixtures of fiber-reactive dyes are known from U.S. Pat. No. 5,445,654, from Japanese Patent Application Publications Sho-58-160 362 and Hei-1-315469 as well as from Korean Patent Application Publication No. 93-5679. However, these dye mixtures have still some deficiencies, such as in respect to wash fastness and dischargeability.

With the present invention, deep black-dyeing dye mixtures of improved properties have been found, comprising one or more, such as one, two or three, disazo dyes conforming to the general formula (1), one or more, such as one, two or three, monoazo dyes conforming to the general formula (2) and optionally one or two monoazo dyes conforming to the general formula (3), defined below, the dye, respectively dyes, of the general formula (1) or of the general formulae (1) and (3) being present in the mixture in an amount of from 50 to 95% by weight, preferably of from 60 to 80% by weight, and the dye, respectively dyes, of the general formula (2) being present in the dye mixture in an amount of from 5 to 50% by weight, preferably of from 20 to 40% by weight, while the dyes of the formulae (1) and (3), if a dye or dyes of the general formula (3) is present in the dye mixture, are present in relation to one another of 99.5% to 94% in respect of the disazo dye(s) of formula (1) and of 0.5 to 6% by weight in respect of the monoazo dye(s) of formula (3), calculated on the total amount of the dyes of formulae (1) and (3).

The meanings of the symbols in the formulae (1) to (3) are as follows:

$R^1$ is hydrogen, methyl, ethyl, methoxy, ethoxy, sulfo or carboxy, preferably methoxy or hydrogen and in particular hydrogen, $R^2$ is hydrogen, methyl, ethyl, methoxy, ethoxy, sulfo or carboxy, preferably hydrogen, $R^3$ is hydrogen, methyl, ethyl, methoxy, ethoxy, sulfo or carboxy, preferably methoxy or hydrogen and in particular hydrogen, $R^4$ is hydrogen, methyl, ethyl, methoxy, ethoxy, sulfo or carboxy, preferably hydrogen, $R^5$ is hydrogen, methyl, ethyl, methoxy, ethoxy, sulfo or carboxy, preferably methoxy or hydrogen and in particular hydrogen, $R^6$ is hydrogen, methyl, ethyl, methoxy, ethoxy, sulfo or carboxy, preferably hydrogen, Y is in each instance, independently of the others, vinyl or is ethyl which is substituted in the β-position by a substituent which is eliminated by the action of an alkali, forming the vinyl group, such as chlorine, thiosulfato, sulfato, alkanoyloxy of 2 to 5 carbon atoms, such as acetyloxy, phosphate, sulfobenzoyloxy and p-toluylsulfonyloxy, and Y is preferably vinyl, β-chloroethyl, β-thiosulfatoethyl or β-sulfatoethyl and is in particular preferably vinyl or β-sulfatoethyl;

M is hydrogen or an alkali metal, such as lithium, sodium and potassium; the groups —SO₂—Y are preferably bonded to the benzene ring meta or preferably para to the azo group.

Both in the formulae mentioned above and in those below the individual formula members, both with different and with the same designation within a formula, can within the scope of their definition have meanings which are the same as or different from one another.

The groups "sulfo", "thiosulfato", "carboxy", "phosphato" and "sulfato" include both the acid form and the salt form of these groups. Accordingly, sulfo groups are groups of the formula —SO₃M, thiosulfato groups are groups of the formula —S—SO₃M, carboxy groups are groups of the formula —COOM, phosphato groups are groups of the formula —OPO₃M₂ and sulfato groups are groups of the formula —OSO₃M, in which M is defined as above.

The dyes according to the general formula (1) are known from the U.S. Pat. Nos. 2,657,205, 3,387,914, 4,072,463 and 4,257,770. The dyes of the general formula (3) are known, for example, from European Patent Application Publication No. 0,832,939 and the dyes of the general formula (2) from European Patent Application Publication No. 0,090,114.

The dye mixtures according to the invention may additionally comprise a yellow or red shading dye in an amount of up to about 5% by weight. Known dyes of this type are for example azo dyes conforming to the formulae (a), (b), (c) and (d)

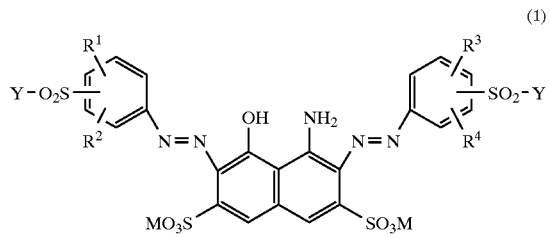

(1)

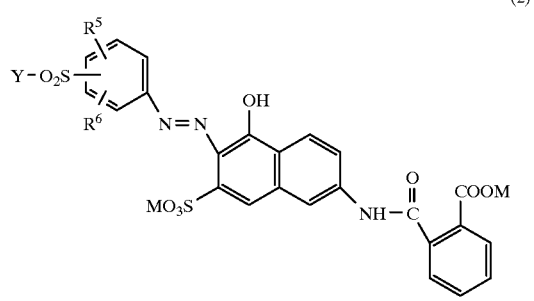

(2)

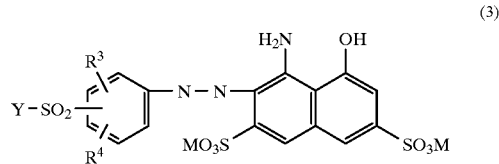

(3)

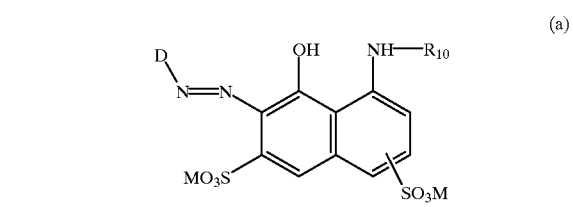

(a)

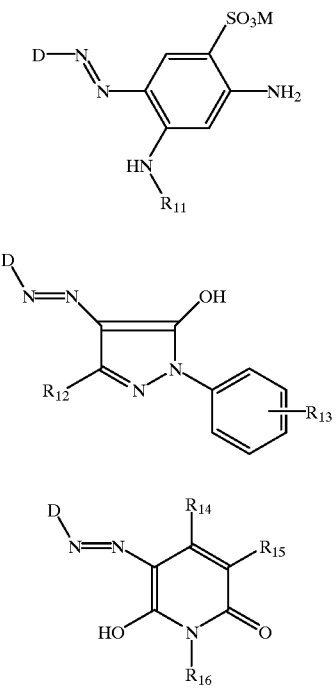

Radicals of the formulae (4), (5) and (6)

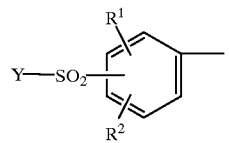

(4)

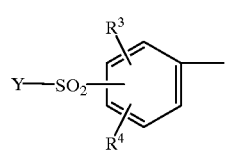

(5)

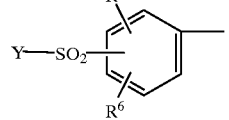

(6)

where

D is 3-(β-sulfatoethylsulfonyl)phenyl, 4-(β-sulfatoethylsulfonyl)phenyl, 3-vinylsulfonylphenyl or 4-vinylsulfonylphenyl, M is defined above, $R_{10}$ is acetyl, benzoyl or carboxybenzoyl, $R_{11}$ is acetyl, carbamoyl or hydrogen, $R_{12}$ is methyl or carboxy, $R_{13}$ is sulfo, β-chloroethylsulfonyl, β-sulfatoethylsulfonyl or vinyl, $R_{14}$ is hydrogen or methyl, $R_{15}$ is hydrogen, cyano, carbamoyl, carboxy or sulfomethyl, and $R_{16}$ is methyl, ethyl or β-sulfoethyl.

The dyes of the general formulae (1), (2) and (3), in particular if those corresponding to the same general formula, have the same chromophore, can have, within the meaning of Y, structurally different fiber-reactive groups —$SO_2$—Y. In particular, the dye mixture can contain dyes of the same chromophore conforming to the formula (1) and/or dyes of the same chromophore conforming to formula (2) and optionally likewise of the general formula (3) in which the fiber-reactive groups —$SO_2$—Y are partly vinylsulfonyl groups and partly groups in which Y is a β-ethyl substituted group as defined above, such as β-chloroethylsufonyl, β-thiosulfatoethylsulfonyl or, preferably, β-sulfatoethylsulfonyl groups. If the dye mixtures contain the respective dye components in the form of a vinylsulfonyl dye, the proportion of the respective vinylsulfonyl dye to the respective dye with Y being a β-ethyl substituted groups as defined above, such as a β-chloro- or β-thiosulfato- or β-sulfatoethyl-sulfonyl dye, will be up to about 30 mol-%, based on the respective dye chromophore. Preference is here given to the dye mixtures in which the proportion of vinylsulfonyl dye to said β-ethyl substituted dye, such as β-sulfatoethylsulfonyl dye is in terms of the molar ratio between 5:95 and 30:70.

in the dyes of formulae (1), (2) and (3) are, for example, 2-(β-sulfatoethylsulfonyl)phenyl, 3-(β-sulfatoethylsulfonyl)phenyl, 3- or 4-vinylsulfonylphenyl, 4-(β-sulfatoethylsulfonyl)phenyl, 2-carboxy-5-(β-sulfatoethylsulfonyl)phenyl, 4-methoxy-3-(β-sulfatoethylsulfonyl)-phenyl, 2-ethoxy-4- or -5-(β-sulfatoethylsulfonyl)phenyl, 2-methyl-4-(β-sulfatoethylsulfonyl)-phenyl, 2-methoxy-5- or -4-(β-sulfatoethylsulfonyl)phenyl, 2,4-diethoxy-5-(β-sulfatoethylsulfonyl)phenyl, 2,4-dimethoxy-5-(β-sulfatoethylsulfonyl)phenyl, 2,5-dimethoxy-4-(β-sulfatoethylsulfonyl)phenyl, 2-methoxy-5-methyl-4-(β-sulfatoethylsulfonyl)phenyl, 2- or 3- or 4-(β-thiosulfatoethylsulfonyl)phenyl, 2-methoxy-5-(β-thiosulfatoethylsulfonyl)phenyl, 2-sulfo-4-(β-phosphatoethylsulfonyl)phenyl, 2-sulfo-4-vinylsulfonylphenyl and 3-or 4-(β-acetoxyethylsulfonyl)phenyl and their corresponding vinylsulfonyl derivatives.

Preference is further given to the dye mixtures according to the invention, in which the formula members $R^1$, $R^2$, $R^3$ and $R^4$ as well as $R^5$ and $R^6$ are each hydrogen and the formula members Y are each, independently of one another, vinyl or β-sulfatoethyl. The dye mixtures according to the invention thus represent in particular mixtures of one or more, such as one, two or three, preferably one or two, disazo dyes conforming to the general formula (1A), one or more monoazo dyes, such as one, two or three, preferably one or two, monoazo dyes conforming to the general formula (2A) and optionally one or two monoazo dyes conforming to the general formula (3A)

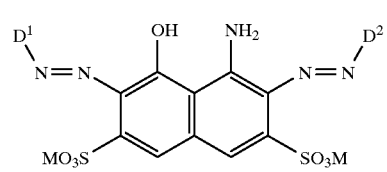

(1A)

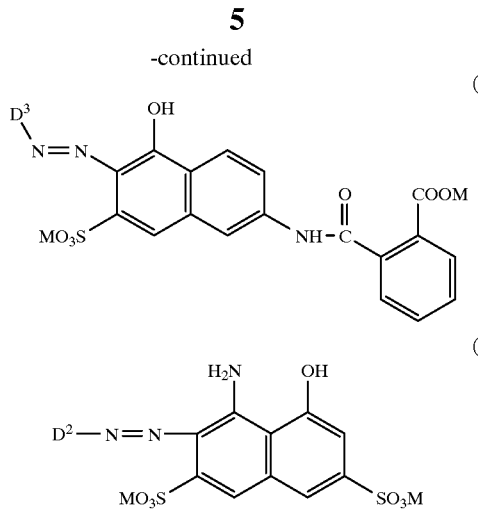

(2A)

(3A)

in the dye weight-ratios which have been given above for the corresponding formulae (1), (2) and (3), where M is as defined above and $D^1$, $D^2$ and $D^3$ are each independently of the others 3-vinylsulfonylphenyl, 4-vinylsulfonylphenyl, 3-(β-sulfatoethylsulfonyl)phenyl or 4-(β-sulfatoethylsulfonyl)phenyl, and if vinylsulfonyl as well as β-sulfatoethylsulfonyl groups are present in the dye mixtures the molar ratio between the vinylsulfonyl portions and the β-sulfatoethylsulfonyl portions is in a molar ratio between 5:95 and 30:70. In particular, the formula members $D^1$, $D^2$ and $D^3$ have the same meaning.

The dye mixtures of the invention can be present as a preparation in solid or liquid (dissolved) form. In solid form they generally contain the electrolyte salts customary in the case of water-soluble and in particular fiber-reactive dyes, such as sodium chloride, potassium chloride and sodium sulfate, and also the assistants customary in commercial dyes, such as buffer substances capable of establishing a pH in aqueous solution between 3 and 7, such as sodium acetate, sodium borate, sodium bicarbonate, sodium dihydrogenphosphate and disodium hydrogenphosphate, small amounts of siccatives or, if they are present in liquid, aqueous solution (including the presence of thickeners of the type customary in print pastes), substances which ensure the permanence of these preparations, for example mold preventatives.

If the dye mixtures take the form of dye powders, they contain, as a rule, 10 to 80% by weight, based on the dye powder or preparation, of a strength-standardizing colorless diluent electrolyte salt, such as those mentioned above. These dye powders may in addition contain the abovementioned buffer substances in a total amount of up to 5%, based on the dye powder. If the dye mixtures of the invention are present in aqueous solution, the total dye content of these aqueous solutions is up to about 50% by weight, the electrolyte salt content of these aqueous solutions preferably being below 10% by weight, based on the aqueous solutions (liquid preparations) can in general contain the abovementioned buffer substances in an amount of up to 5% by weight, preferably up to 2% by weight.

The dye mixtures of the invention can be obtained in a conventional manner, for instance by mechanically mixing the individual dyes in the required proportions or by synthesis by means of the customary diazotization and coupling reactions using appropriate mixtures of the diazo and coupling components in a manner familiar to those skilled in the art and the necessary proportions. One option is for example to prepare aqueous solutions of the two coupling components 1-amino-8-naphthol-3,6-disulfonic acid and the acylation product of 7-amino-4-hydroxy-napthalene-2-sulfonic acid and phthalic anhydride and of the aniline compounds of the formulae (7), (8) and (9) as diazo components.

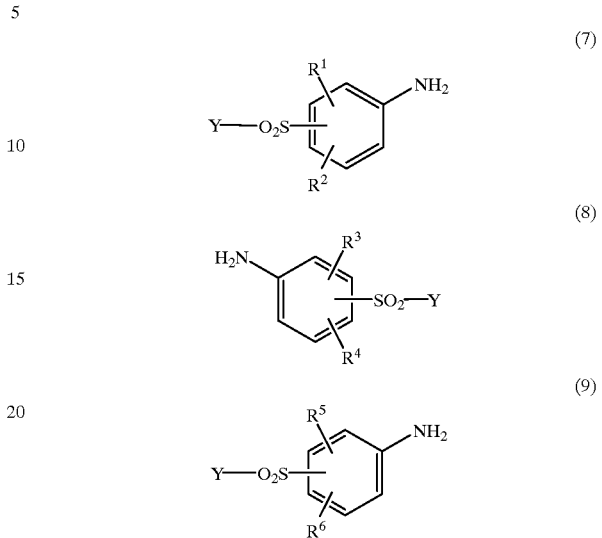

where $R^1$, $R^2$, $R^3$, $R^4$, $R^5$, $R^6$ and Y are each as defined above, in the same reaction batch in appropriate proportions, diazotizing these aniline compounds in a conventional manner in a strongly acid medium and carrying out the coupling reaction of the 1-amino-8-napthol-3,6-disulfonic acid first at a pH of below 1.5 and thereafter the second coupling reaction with the monoazo dye of formula (3) produced to form the disazo dye conforming to the formula (1) as well as to form the monoazo dye of formula (2) at a pH of between 3 and 6 and of a temperature of 10 to 20° C. A further embodiment to synthesize the dye mixture according to the invention by chemical reaction is, for example, to diazotize, in the same reaction batch, aniline compounds of the general formulae (7) and (8) with 1-amino-8-naphthol-3,6-disulfonic acid, as mentioned above, at a pH of below 1.5 and at a temperature of 10 to 20° C., thereafter slowly adding an alkaline reacting agent, such as sodium carbonate, to adjust a pH of between 3 and 6, thus causing the second coupling reaction to form the disazo dye of formula (1), and then adding an aqueous solution of the coupling component 3-(2'-carboxy-benzoyl)-amino-8-naphthol-6-sulfonic acid as well as an aqueous solution or suspension of the diazotized aniline of general formula (9) while maintaing the pH of 3 to 6 and at a temperature of 10 to 20° C., to form the monoazo dye of the general formula (2).

The dye mixtures according to the invention thus obtained can be isolated from the solution by the conventional manner, for example by salting out with an electrolyte salt, such as sodium chloride, potassium chloride or lithium chloride, or by spray-drying.

Dye mixtures of the invention in which the dye chromophores contain for example not only a β-chloroethylsulfonyl or β-thiosulfatoethylsulfonyl or β-sulfatoethylsulfonyl group but also proportions with vinylsulfonyl groups cannot only be prepared by the abovementioned method but also using appropriate vinylsulfonyl starting anilines by reacting the dye mixture in which Y is a β-chloroethyl, β-thiosulfatoethyl or β-sulfatoethyl radical, with an amount of alkali required for only part of these groups and converting part said β-substituted ethylsulfonyl groups into vinylsulfonyl groups. This measure is carried out by generally known methods of converting β-substituted ethylsulfonyl groups into the vinylsulfonyl group. The dye mixtures of the instant invention are well suitable for dyeing (which includes printing) hydroxy- and/or carboxamido-containing fiber materials by the application and fixing methods numerously described in the art for fiber-reactive dyes, in deep black shades with good color build-up and good wash-off in respect of unfixed dye portions. Moreover, the dyeings obtained are readily dischargeable.

The present invention therefore also provides for use of the novel dye mixtures for dyeing (including printing) hydroxy- and/or carboxamido-containing fiber materials and processes for dyeing such fiber materials and processes for dyeing such materials using a dye mixture according to the invention by applying the dye mixture to the substrate in dissolved form and fixing the dyes on the fiber by the action of an alkali or by heating or both.

Hydroxy-containing materials are natural or synthetic hydroxy-containing materials, for example cellulose fiber materials, including in the form of paper, or their regenerated products and polyvinyl alcohols. Cellulose fiber materials are preferably cotton but also other natural vegetable fibers, such as linen, hemp, jute and ramie fibers; regenerated cellulose fibers are for example staple viscose and filament viscose.

Carboxamido-containing materials are for example synthetic and natural polyamides and polyurethanes, in particular in the form of fibers, for example wool and other animal hairs, silk, leather, nylon-6,6, nylon-6, nylon-11, and nylon4.

Application of the dye mixtures of the invention is by generally known processes for dyeing and printing fiber materials by the known application techniques for fiber-reactive dyes. Since the dyes of the dye mixtures according to the invention are highly compatible with one another, the dye mixtures of the invention are also advantageously useful in exhaust dyeing processes. Applied in this way for example to cellulose fibers from a long liquor ratio at temperatures between 40 and 105° C., optionally at temperatures up to 130° C., under superatmospheric pressure, and optionally in the presence of customary dyeing assistants with the use of acid-binding agents and optionally neutral salts, such as sodium chloride or sodium sulfate, they produce dyeings in very good color yields with excellent color build-up and consistent shade. One possible procedure is to introduce the material into the warm bath, gradually heat the bath to the desired dyeing temperature, and complete the dyeing process at that temperature. The neutral salts which speed up the exhaustion of the dyes can also if desired not be added to the bath until the actual dyeing temperature has been reached.

Similarly, the conventional printing processes for cellulose fibers, which can either be carried out in single-phase, for example by printing with a print paste containing sodium bicarbonate or some other acid-binding agent and the colorant, and subsequent steaming at from 100 to 103° C., or in two phases, for example by printing with a neutral or weakly acid print paste containing the colorant and subsequent fixation either by passing the printed material through a hot electrolyte-containing alkaline bath or by overpadding with an alkaline electrolyte-containing padding liquour and subsequent batching of this treated material or subsequent steaming or subsequent treatment with dry heat, produce strong prints with well defined contours and a clear white ground. Changing fixing conditions has only little effect on the outcome of the prints. Not only in dyeing but also in printing the degrees of fixation obtained with dye mixtures of the invention are very high. The hot air used in dry heat fixing by the customary thermofix processes has a temperature of from 120 to 200° C. In addition to the customary steam at from 101 to 103° C., it is also possible to use superheated steam and high pressure steam at up to 160° C.

Acid-binding agents responsible for fixing the dyes to cellulose fibers are for example water-soluble basic salts of alkali metals and of alkaline earth metals of inorganic or organic acids, and compounds which release alkali when hot. Of particular suitability are the alkali metal hydroxides and alkali metal salts of weak to medium inorganic or organic acids, the preferred alkali metal compounds being the sodium and potassium compounds. These acid-binding agents are for example sodium hydroxide, potassium hydroxide, sodium carbonate, sodium bicarbonate, potassium carbonate, sodium formate, sodium dihydrogenphosphate and disodium hydrogenphosphate.

Treating the dyes of the dye mixtures according to the invention with the acid-binding agents with or without heating bonds the dyes chemically to the cellulose fiber; especially the dyeings on cellulose, after they have been given the usual aftertreatment of rinsing to remove unfixed dye portions, show excellent wet fastness properties, in particular since the unfixed dye portions are readily washed off because of their good cold water solubility.

The dyeings of polyurethane and polyamide fibers are customarily carried out from an acid medium. The dyebath may contain for example acetic acid and/or ammonium sulfate and/or acetic acid and ammonium acetate or sodium acetate to bring it to the desired pH. To obtain a dyeing of acceptable levelness it is advisable to add customary leveling assistants, for example based on a reaction product of cyanuric chloride with three times the molar amount of an aminobenzenesulfonic acid or aminonaphthalenesulfonic acid or based on a reaction product of for example stearylamine with ethylene oxide. In general the material to be dyed is introduced into the bath at a temperature of about 40° C. and agitated therein for some time, the dyebath is then adjusted to the desired weakly acid, preferably weakly acetic acid, pH, and the actual dyeing is carried out at temperature between 60 and 98° C. However, the dyeings can also be carried out at the boil or at temperatures up to 120° C. (under superatmospheric pressure).

The Examples which follow illustrate the invention. Parts and precentages are by weight, unless otherwise stated. The parts by weight bear the same relation to parts by volume as the kilogram to the liter.

EXAMPLE 1

200 parts of an electrolyte-containing dye powder which contains the navy-dyeing disazo dye of the formula (A)

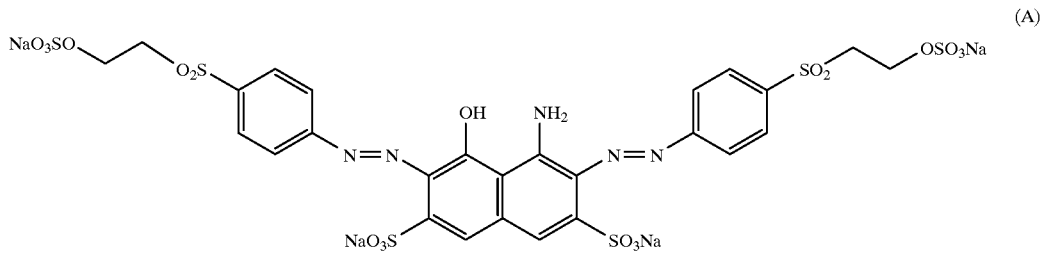

(A)

in a proportion of 50% are mechanically mixed with 75 parts of an electrolyte-containing dye powder which contains the golden orange-dyeing monoazo of the formula (B).

(B)

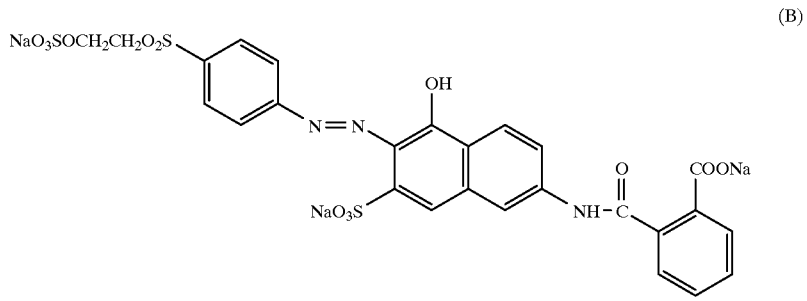

in a 70% proportion. The resulting dye mixture according to the invention, when employed according to the the application and fixing methods customary in the art for fiber-reactive dyes, produces for example on cellulose fiber materials dyeings and prints in deep black shades.

EXAMPLE 2

A dye mixture according to the invention is prepared by diazotizing a suspension of 281 parts of $^4$-(β-sulfatoethylsulfonyl)aniline in 650 parts of ice-water and 180 parts of 30% aqueous hydrochloric acid with 173 parts of 40% strength aqueous sodium nitrite solution. 120 parts of 1-amino-8-napthol-3,6-disulfonic acid is added and the first coupling is carried out at a pH between 1 and 1.3 and at a temperature below 20° C. (the pH is maintained with about 50 parts of sodium bicarbonate). In a separate reaction, 60 parts of 7-amino-4-hydroxy-napthalene-2-sulfonic acid is acylated with 41 parts of phthalic anhydride at a pH of from 6 to 7 with sodium carbonate and at a temperature of 20 to 40° C. The resulting acylated coupler solution is added to the above coupling mixture and the pH is raised to 3 to 6 with sodium carbonate at a temperature below 20° C.

A deep black dye solution is obtained containing the dyes of formulae (A) and (B) mentioned in Example 1 in the ratio of 75%:25%. This dye solution can be adjusted to pH 4.5 by adding 5 parts of a sodium phosphate buffer. By further diluting with water or by evaporating the solution, this liquid dye mixture can then be standardized to the desired strength for a liquid preparation. The dye mixture affords deep black shades on cellulose.

EXAMPLE 2a

The method described in Example 2 can be used to prepare a similar dye mixture by varying the amount used of starting compounds, for example the amount of 1-amino-8-naphthol-3,6-disulfonic acid in an amount of 111 parts, the amount of 7-amino4-hydroxy-napthalene-2-sulfonic acid in an amount of 72 parts and the amount of phthalic anhydride in an amount of 49 parts. A dye mixture is obtained in which the dyes of formulae (A) and (B) are present in the ratio of about 70%:30%. The dye mixture can be isolated from the synthesis solution, for example by spray drying, or else be used directly as a liquid for dyeing. Employed according to the application and fixing methods customary in the art for fiber-reactive dyes, it produces for example on cellulose fiber materials dyeings and prints in deep black shades.

EXAMPLE 2b

The method described in Example 2 can be used to prepare a similar dye mixture by varying the amount used of starting compounds, for example the amount of 1-amino-8-naphthol-3,6-disulfonic acid in an amount of 96 parts, the amount of 7-amino-4-hydroxy-napthalene-2-sulfonic acid in an amount of 96 parts and the amount of phthalic an hydride in an amount of 65 parts.

A dye mixture is obtained in which the dyes of formulae (A) and (B) are present in the ratio of about 60%:40%. The dye mixture can be isolated from the synthesis solution, for example by spray drying, or else be used directly as a liquid for dyeing. Employed according to the application and fixing methods customary in the art for fiber-reactive dyes, produces for example on cellulose fiber materials dyeings and prints in deep black shades.

EXAMPLE 3

To prepare a dye mixture in which some of the dyes have β-sulfatoethylsulfonyl group while the rest has as vinylsulfonyl group, the solution of the novel dye mixture prepared in Example 2 is used as the starting point. 25% by volume of this solution is separated off, adjusted with sodium carbonate to a pH of 8 to 10 and subsequently stirred at 30 to 40° C. for a further 30 minutes, in the course of which the β-sulfatoethylsulfonyl groups are transformed into vinylsulfonyl groups. Thereafter sulfuric acid is used to lower the pH to 4.0 to 5.0, and this solution of the vinylsulfonyl dye mixture is added to the original solution of the β-sulfatoethylsulfonyl dye mixture. The result is an aqueous solution of dyes conforming to the formulae (A-1) and (B-1)

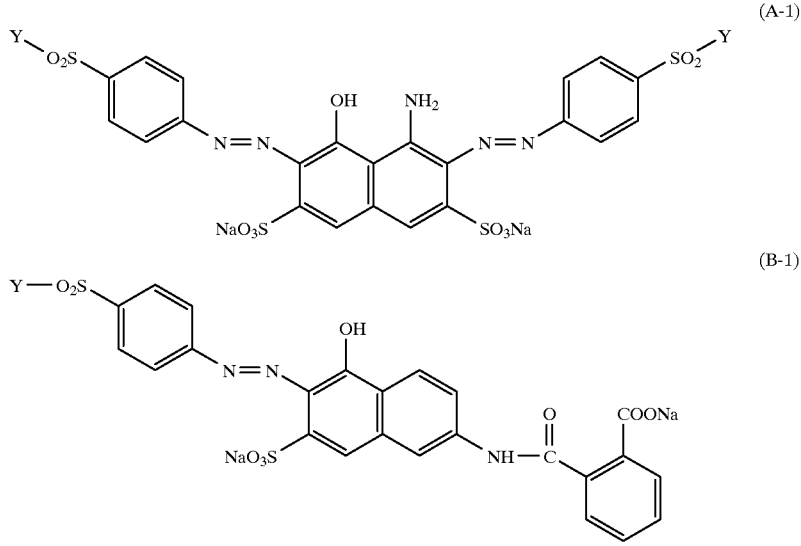

where Y is 25% vinyl and 75% 1-sulfatoethyl.

The filtrate is adjusted with 5 parts of sodium phosphate buffer to a pH of 4.5. By adding or evaporating water, this aqueous solution can be adjusted to the strength desired for a liquid preparation and be used directly for dyeing. When the customary application and fixing methods in the art for fiber-reactive dyes are employed deep black shades are produced.

EXAMPLE 4

A dye mixture according to the invention is prepared by preparing the disazo dye of the formula (A) and the monoazo dye (C)

sulfatoethylsulfonyl)aniline and coupling with 80 parts of the acylation product of 7-amino-4-hydroxynaphthalene-2-sulfonic acid and phthalic anhydride and mixing the two resulting dye solutions. This dye mixture too, employed by the application and fixing methods customary in the art for fiber-reactive dyes, produces for example on cotton deep black dyeings.

EXAMPLE 5

70 parts of an electrolyte-containing dye powder which contains the orange-dyeing monoazo dye of the abovementioned formula (C) in a proportion of 70%, 200 parts of an electrolyte-containing dye powder which contains the navy-dyeing disazo dye of the formula (A) in a proportion of 50% and for the purpose of shading 15 parts of an electrolyte-containing dye powder which contains the yellow-dyeing monoazo dye of the formula (D)

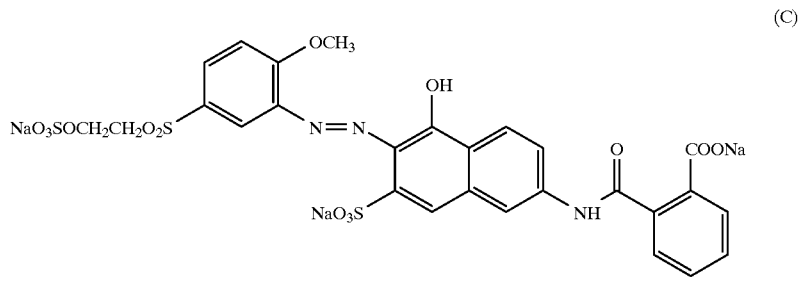

in separate batches in a conventional manner and mixing the two dye solutions in appropriate proportions to form the aqueous solution of a dye mixture according to the invention. For instance, the disazo dye of formula (A) can be prepared by diazotizing and coupling a suspension of 169 parts of 4-(β-sulfatoethylsulfonyl)aniline with 96 parts 1-amino-8-naphthol-3,6-disulfonic acid and the dye of formula (C) by diazotizing 62 parts of 2-methoxy-5-(β-

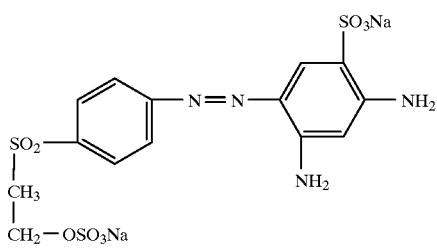

(D)

in a proportion of 50% are mechanically mixed with one another. The dye mixture according to the invention, employed by the application and fixing methods customary in the art for fiber-reactive dyes, produces for example on cotton deep black dyeings with a slightly-greenish tint.

EXAMPLES 6 TO 17

The Table Examples which follow describe further novel dye mixtures of the dyes conforming to the general formulae (1), (2) and (3) in terms of the components of these dyes (M has one of the abovementioned meanings) and the mixing ratios. When employed according to the application and fixing methods customary in the art for fiber-reactive dyes, these dye mixtures produce, for example, on cellulose fiber materials, deep black dyeings.

| Ex. | Radical (4) | Radical (5) | Radical (6) | Ratio of (1):(2):(3) |
|-----|-------------|-------------|-------------|---------------------|
| 6 | 2-methoxy-5-(β-sulfatoethylsulfonyl)-phenyl | 4-(β-sulfato-ethylsulfonyl)-phenyl | 2-sulfo-4-(β-sulfatoethyl sulfonyl)-phenyl | 60:39:1 |
| 7 | 2-sulfo-4-(β sulfatoethylsulfonyl)-phenyl | 4-(β-sulfato-ethylsulfonyl)-phenyl | 4-(β-sulfato-ethylsulfonyl)-phenyl | 70:25:5 |
| 8 | 2-carboxy-4-(β-sulfatoethylsulfonyl)-phenyl | dito | dito | 65:33:2 |
| 9 | 2-methoxy-5-methyl-4-(β-sulfatoethyl-sulfonyl)-phenyl | dito | dito | 80:19:1 |
| 10 | 2,5-dimethoxy-4-(β-sulfatoethyl sulfonyl)-phenyl | dito | dito | 75:24:1 |
| 11 | 4-(β-sulfatoethyl sulfonyl)-phenyl | 3-(β-sulfato-ethylsul-fonyl)-phenyl | 3-(β-sulfato-ethylsul-fonyl)-phenyl | 65:34:1 |
| 12 | 2-sulfo-4-(β-sulfato-ethylsul-fonyl)-phenyl | 4-(β-sulfato-ethylsulfonyl)-phenyl | 2-methoxy-5-(β-sulfatoethyl-sulfonyl)-phenyl | 65:35:0 |
| 13 | dito | dito | 2-methoxy-5-methyl-4-(β-sulfatoethyl sulfonyl)-phenyl | 70:30:0 |
| 14 | dito | dito | 3-(β-sulfatoethyl sulfonyl)-phenyl | 60:40:0 |
| 15 | 4-(β-sulfatoethyl-sulfonyl)-phenyl | dito | 2-sulfo-4-(β-sulfato-ethylsul-fonyl)-phenyl | 70:27:3 |
| 16 | 2-methoxy-5-(β sulfatoethylsul-fonyl)-phenyl | dito | 2-carboxy-4-(β sulfatoethylsul-fonyl)-phenyl | 66:33:1 |
| 17 | 4-(β-sulfatoethyl sulfonyl)-phenyl | dito | 4-(β-sulfatoethyl sulfonyl)-phenyl | 63:34.5:2.5 |

What is claimed is:

1. A dye mixture comprising one or more disazo dyes conforming to the general formula (1), one or more monoazo dyes conforming to the general formula (2) and optionally one or two monoazo dyes conforming to the general formula (3)

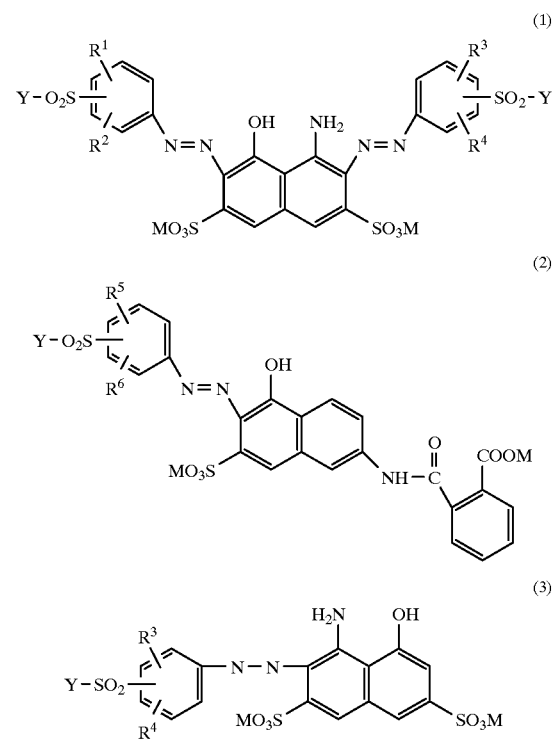

wherein:

$R^1$ is hydrogen, methyl, ethyl, methoxy, ethoxy, sulfo or carboxy;

$R^2$ is hydrogen, methyl, ethyl, methoxy, ethoxy, sulfo or carboxy;

$R^3$ is hydrogen, methyl, ethyl, methoxy, ethoxy, sulfo or carboxy;

$R^4$ is hydrogen, methyl, ethyl, methoxy, ethoxy, sulfo or carboxy;

$R^5$ is hydrogen, methyl, ethyl, methoxy, ethoxy, sulfo or carboxy;

$R^6$ is hydrogen, methyl, ethyl, methoxy, ethoxy, sulfo or carboxy;

Y is in each instance, independently of the others, vinyl or is ethyl which is substituted in the β-position by a substituent which is eliminated by the action of an alkali, forming the vinyl group;

M is hydrogen or an alkali metal;

the dye, respectively dyes, of the general formula (1) or of the general formulae (1) and (3) being present in the mixture in an amount of from 50 to 95% by weight, and the dye, respectively dyes, of the general formula (2) being present in the dye mixture in an amount of from 5 to 50% by weight, while the dyes of the formulae (1) and (3), if a dye or dyes of the general formula (3) being present in the dye mixture, are present in relation to one another of 99.5% to 94% in respect of the disazo dye(s) of formula (1) and of 0.5 to 6% by weight in respect of the monoazo dye(s) of formula (3), calculated on the total amount of the dyes of formulae (1) and (3).

2. A dye mixture according to claim I comprising one or more disazo dyes of formula (1) and optionally one or two monoazo dyes conforming to formula (3) in a total amount of from 60 to 80% by weight and one or more monoazo dyes of formula (2) in an amount of from 20 to 40% by weight.

3. A dye mixture according to claim 1, wherein $R^1$, $R^3$ and $R^5$ are each independently of one another hydrogen or methoxy and $R^2$, $R^4$ and $R^6$ are each hydrogen.

4. A dye mixture according to claim 1, wherein $R^1$, $R^2$, $R^3$, $R^4$, $R^5$ and $R^6$ are each hydrogen.

5. A dye mixture according to claim 1, wherein Y is in each instance, independently of the others, vinyl or is ethyl substituted in the β-position by chlorine, thiosulfato, sulfato, alkanoyloxy of 2 to 5 carbon atoms, phosphato, sulfobenzoyloxy or p-toluylsulfonyloxy.

6. A dye mixture according to claim 1, wherein Y is in each instance, independently of the others, vinyl or β-sulfatoethyl.

7. A dye mixture according to claim 1, wherein the group(s) —$SO_2$—Y being bonded to the benzene nucleus in meta- or para-position to the azo group(s).

8. A dye mixture according to claim 1, wherein the group(s) —$SO_2$—Y being bonded to the benzene nucleus in para-position to the azo group(s).

9. A process for dyeing hydroxy-and/or carboxamido-containing fiber material which comprises applying the dye mixture as claimed in claim 1 to the material and the dye mixture is fixed to the material by means of heat or with the aid of an alkali or by means of heat and with the aid of an alkali.

* * * * *